Patented Dec. 6, 1949

2,490,705

UNITED STATES PATENT OFFICE 2,490,705

HEAVY METAL NICOTINYL FLUOSILICATES

John H. Pearson, Manhasset, and Howard D. Segool, Flushing, N. Y., assignors to Allied Chemical & Dye Corporation, a corporation of New York No Drawing. Application September 16, 1944, Serial No. 554,538

3 Claims. (Cl. 260—270)

This invention is directed to provision of new metal nicotinyl fluosilicate products, and provision of new parasiticides. More particularly, the invention aims to provide metal nicotinyl fluosilicates which contain chemically bound nicotine.

It is an object of this invention to provide new chemical compounds useful for parasiticidal purposes which combine the insecticidal properties of nicotine, the stomach poison properties of fluosilicates and the fungicidal properties of metal compounds such as copper or zinc, in which the nicotine, fluosilicate and the metal are in chemically combined form. While it is to be expected that the organic base nicotine would react with hydro-fluosilicic acid to produce nicotine-fluosilicate (which is, in fact, well known), to the best of our knowledge and belief, prior to our invention compounds in which metals such as copper or zinc, fluosilicate and nicotine are in chemical combination have not been produced. We have made the discovery of the existence of such compounds and that they possess properties which render them markedly suitable for use as parasiticides.

The new products may be made by reacting nicotine, e. g. commercial nicotine which may contain 5 to 10% water with suitable metal fluosilicates in a polar solvent for the nicotine and metal fluosilicate and chemically inert thereto at room temperature or higher temperature below that at which substantial decomposition of the metal fluosilicate occurs.

Metal fluosilicates which may be utilized are those metal fluosilicates in which the metals of the fluosilicates are metals which form complex ions with ammonia in aqueous solution, for example fluosilicates of copper ($CuSiF_6.4H_2O$), zinc ($ZnSiF_6.6H_2O$), cobalt ($CoSiF_6.6H_2O$), and nickel ($NiSiF_6.6H_2O$). While preferred embodiments are directed to and the invention will be described mostly in connection with copper nicotinyl fluosilicate and zinc nicotinyl fluosilicate, it is to be understood the invention is not thusly limited.

One example of a procedure for making one of the products of the invention is as follows: 20 parts by weight of 95—98% commercial nicotine were dissolved in 60 parts of methyl alcohol. 40 parts of commercial $CuSiF_6.4H_2O$ were dissolved in 276 parts of methyl alcohol, and the resulting liquor was filtered to remove some silica. The filtrate was gradually added at room temperature to the solution of nicotine in methyl alcohol. A flocculent precipitate appeared as the copper fluosilicate solution was mixed with the nicotine solution, and as the addition of the copper fluosilicate solution continued a dark green gum appeared. The mix was triturated and allowed to stand for two days. The gum had substantially solidified. Supernatant liquor was poured off. The residue was triturated twice with fresh methyl alcohol, filtering between each operation. 19 parts of crude solid residue, containing by weight 23.65% Cu, 4.98% Si, 21.06% F, and 12.0% $C_{10}H_{14}N_2$, were obtained. This material is referred to herein as product A.

Products of the invention may be in liquid, semi-liquid and preferably dry form. In making dry products, the material may be dried to constant weight in any suitable way, but temperature should not exceed the decomposition temperature of the metal fluosilicate, about 140° C. for copper fluosilicate, and about 110° C. for zinc fluosilicate.

Improved products and parasiticides within the scope of the invention and having metal fluosilicate:fixed nicotine mol ratio of 1:not less than 1 (having relatively high fixed nicotine contents) may be made by below-described methods in which reaction of nicotine and the particular metal fluosilicate used is carried out at elevated temperature below that at which substantial decomposition of the metal fluosilicate occurs, preferably by heating to a temperature within the range of room temperature (25° C.) to 140° C. in a suitable solvent.

The solvents which may be employed are any solvent which is chemically inert to the metal fluosilicate and nicotine and in which the reactants are soluble under reaction conditions. Polar solvents such as water, the lower aliphatic alcohols, particularly the aliphatic monohydric alcohols having less than 6 carbon atoms, or any mixtures of the foregoing have been found suitable. In this specification and appended claims, the term "lower alcohol" is to be considered as including all of the alcohols below hexyl alcohol, $C_6H_{13}OH$. Of the alcohols, methanol is preferred; water which is cheap and readily available is considered a satisfactory solvent.

By proceeding as indicated there is formed a reaction mass containing the sought-for metal nicotinyl fluosilicate. To illustrate, when using as reactants commercial nicotine containing about 5% water, commercially obtainable copper fluosilicate ($CuSiF_6.4H_2O$), water as the solvent, and heating the reaction mixture at about 60° C., there is formed a reaction mass comprising copper nicotinyl fluosilicate in water.

When solid products are desired, they are recovered from the reaction mass at temperatures not above the decomposition temperature of the metal fluosilicate. Aside from this temperature control feature, solid product may be recovered from the reaction mass in any otherwise suitable way. For example, when the solvent employed is water, production of solid product may be had by evaporating the liquid phase to approximate dryness under any conditions, e. g., reduced pressure, in which the decomposition temperature is not exceeded. Solid residue of this evaporation operation may be dried to constant weight by mild heating, or by sulfuric acid desiccation in vacuum, final drying being such that under all circumstances temperatures are not more than the aforesaid decomposition temperature. If a solvent such as methanol is used, dry product may be recovered from the liquid phase by repeated methanol extraction by means of another solvent, such as acetone, which washes out methanol but does not dissolve the solid product. Removal of residual acetone and drying to constant weight may be accomplished by heating under vacuum at less than about 60° C.

In practice of the process for making products of relatively high fixed nicotine content, the metal nicotinyl fluosilicates formed are essentially water soluble and have metal fluosilicate:chemically bound nicotine mol ratio of 1:not less than 1. The dry copper product obtained corresponds with the formula $Cu(C_{10}H_{14}N_2)_xSiF_6 \cdot 2H_2O$ in which X may vary from 1 to 4. Preferred copper products have copper fluosilicate to nicotine mol ratios of from 1:2 to 1:4 and preferred zinc products have zinc fluosilicate to nicotine mol ratios of from 1:1 to 1:1.5. By prolonged low temperature heating at temperatures below the decomposition temperature of the metal fluosilicate, nicotine in the indicated quantities remains chemically fixed while water of crystallization may be removed, and a substantially anhydrous product obtained.

Any suitable proportions of nicotine and metal fluosilicate may be employed. When nicotine and e. g. copper fluocilicate are reacted under the solvent and temperature conditions stated, there is formed copper nicotinyl fluosilicate having a $CuSiF_6:C_{10}H_{14}N_2$ mol ratio of 1 to not less than 1. In an operation in which (1) the quantity of solvent employed is small, i. e. small enough so that all of the $CuSiF_6$ present does not go into solution in the final reaction mass, and (2) the total $CuSiF_6$ present is in excess of that needed to react with the nicotine to form a product having the desired $CuSiF_6:C_{10}H_{14}N_2$ mol ratio; there will be formed a reaction mass containing (a) nicotinyl fluosilicate having the desired $CuSiF_6:C_{10}H_{14}N_2$ mol ratio dissolved in solvent, and (b) some dissolved $CuSiF_6$; and a solid phase consisting of unreacted $CuSiF_6$ in the bottom of the reaction vessel. Solids may be filtered out, the filtrate evaporated to dryness at temperature not above the decomposition temperature of copper fluosilicate (below 130–140° C.), and there is obtained a solid residue consisting of copper nicotinyl fluosilicate in admixture with some relatively small quantity of solid $CuSiF_6$, the amount of which depends upon how much $CuSiF_6$ as such was soluble in the liquid phase of the particular reaction mass. This dry material, though impure to the extent of its $CuSiF_6$ content, is a useful material for parasiticidal purposes, e. g. as an insecticide or fungicide.

In similar operation in which the total $CuSiF_6$ available in the reaction vessel is in excess of that required to form copper nicotinyl fluosilicate having the desired $CuSiF_6:C_{10}H_{14}N_2$ mol ratio and the quantity of solvent employed is larger, i. e. enough so that all excess $CuSiF_6$ present is taken into solution, final reaction mass is largely in the liquid phase and comprises copper nicotinyl fluosilicate having the desired fluosilicate:nicotine mol ratio plus the excess $CuSiF_6$ in solution. On removal of the solvent from the reaction mass, the ultimate dry residue would, as above, be a mixture of copper nicotinyl fluosilicate having the desired $CuSiF_6:C_{10}H_{14}N_2$ mol ratio, together with solid $CuSiF_6$ in quantity depending upon the amount of the excess $CuSiF_6$ present in the reaction mass.

When the products of the invention are to be used, for example as pesticides, this reaction mass is itself a merchantable material; in the case of the copper nicotinyl fluosilicate product the reaction mass may be in the form of a concentrate which, at room temperature, may contain 72% by weight of copper nicotinyl fluosilicate.

If a dry copper nicotinyl fluosilicate product is desired, at the end of the copper fluosilicate-nicotine reaction, whatever solvent used and the copper nicotinyl fluosilicate are separated as above described and, after drying to constant weight, there is obtained a substantially pure copper nicotinyl fluosilicate product which may be pulverized, if desired, and supplied to the trade as a water soluble dust.

Whether the ultimate relatively high fixed nicotine products are substantially pure or in the form of mixtures of copper nicotinyl fluosilicate and other ingredients, such as $CuSiF_6$, the copper nicotinyl fluosilicate constituent of the product is such as to comprise $CuSiF_6$ and fixed nicotine in mol ratio of one $CuSiF_6$ to not less than one and not more than four $C_{10}H_{14}N_2$. Thus, copper nicotinyl fluosilicates containing amounts of fixed nicotine any place within this range may be made by suitably adjusting the quantities of $CuSiF_6$ and nicotine supplied to the reaction. Preferably, the operation is such as to form copper nicotinyl fluosilicate products having

$CuSiF_6:C_{10}H_{14}N_2$ mol ratios of 1:not less than 2 and not more than 4. It will be understood that should there be in the reaction mass, under any conditions of operation, more nicotine than that corresponding with a $CuSiF_6:C_{10}H_{14}N_2$ mol ratio of 1:4, the excess nicotine does not become bound in the product and vaporizes off either during the reaction or subsequently on separation of solvent and copper nicotinyl fluosilicate product.

Using as raw materials commercial

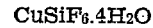

$CuSiF_6 \cdot 4H_2O$ and commercial nicotine containing 5% by weight water and employing in the reaction $CuSiF_6$ and $C_{10}H_{14}N_2$ in mol ratio of 1:2, there has been obtained a solid product analyzing by weight 11.4% Cu, 25.5% $SiF_6$, 56.3% fixed nicotine and 6.8% $H_2O$ by difference. $CuSiF_6 \cdot 2C_{10}H_{14}N_2 \cdot 2H_2O$ contains theoretically, by weight, 11.2% Cu, 25.0% $SiF_6$, 57.1% $C_{10}H_{14}N_2$, and 6.7% $H_2O$. When utilizing in the reaction $CuSiF_6$ and nicotine in mol ratio of 1:4, there has been obtained a product analyzing, by weight, 7.48% Cu, 17.1% $SiF_6$, 73.9% fixed $C_{10}H_{14}N_2$, and 1.5% $H_2O$. $CuSiF_6 \cdot 4C_{10}H_{14}N_2 \cdot 2H_2O$ theoretically contains, by weight, 7.15% Cu, 16.0% $SiF_6$, 72.9% fixed $C_{10}H_{14}N_2$, and 3.9% $H_2O$. While solid products made by drying to constant weight contain two molecules of water of crystallization, it will be understood that water of crystallization may be less, and substantially anhydrous products may be obtained by prolonging heating at temperature less than 60° C., e. g. under vacuum, if desired.

For manufacture of zinc nicotinyl fluosilicate of relatively high fixed nicotine content, operating conditions are as described above except that the zinc nicotinyl fluosilicate products have $ZnSiF_6$:fixed nicotine mol ratios of 1:not less than 1 and not more than 1.5, that is any nicotine present in the reaction in excess of the 1.5 value does not enter into fixed combination with $ZnSiF_6$. Zinc nicotinyl fluosilicate is preferably prepared by adding the nicotine to the alcoholic solvent containing from 5-10% water in which the metal fluosilicate is dissolved. This reaction may be carried out at room temperature, if desired, and should be carried out below 110° C., the decomposition temperature of zinc fluosilicate. Under these conditions most of the zinc nicotinyl fluosilicate will be precipitated. As the ratio of water to alcoholic solvent increases, an increasingly greater quantity of zinc nicotinyl fluosilicate will remain in solution which can be isolated in the solid state by evaporation of the solvent.

In making zinc nicotinyl fluosilicate using $ZnSiF_6.6H_2O$ and nicotine in mol ratio of 1:1.5, there has been made a product containing, by weight, 13.6% Zn, 29.3% $SiF_6$, 48.7% fixed $C_{10}H_{14}N_2$, and 8.4% $H_2O$; $2ZnSiF_6.3C_{10}H_{14}N_2.5H_2O$ theoretically containing, by weight, 13.2% Zn, 28.9% $SiF_6$, 49.2% $C_{10}H_{14}N_2$, and 8.7% $H_2O$. Solid relatively high fixed nicotine zinc nicotinyl fluosilicate products obtained by separation of solvent and drying the residue to constant weight have 5 molecules of water of crystallization.

Following are illustrative examples of manufacture of water soluble metal nicotinyl fluosilicates having a metal fluosilicate:nicotine mol ratio of 1:not less than 1. Products of this type and processes for making the same are disclosed and specifically claimed in co-pending application of de Benneville and Tryon, Serial No. 554,536, filed September 16, 1944.

*Example 1*

To a mixture of 278 parts by weight of $CuSiF_6.4H_2O$ and 324 parts by weight of commercial nicotine containing 5% by weight of water was added 100 parts by weight of water, and the mixture was stirred while heating for 5 minutes at temperature of 60° C. over a water bath. In this run, $CuSiF_6$ and nicotine were employed in mol ratio of 1:2, and the quantity of water employed was more than sufficient so that on completion of reaction all of the $CuSiF_6$ was taken into solution. Final reaction mass was substantially in the liquid phase, and the bulk of the water was removed by heating at temperature of about but not above 60° C. under a vacuum of 70 mm. and less. The product was dried to constant weight by placing it over sulfuric acid in a vacuum of about 5 mm. The dried cake was pulverized, and yield of 390 parts by weight of product containing about 13.4% Cu, 27.7% $SiF_6$, 54.4% $C_{10}H_{14}N_2$, and 4.5% $H_2O$ (by difference) was obtained.

*Example 2*

To 1105 grams of 95% nicotine were added 855 grams of $CuSiF_6.4H_2O$, dissolved in 2500 cc. of methanol. The mixture was heated and stirred for one hour at temperature of about 60° C. on a steam bath. In this instance, copper fluosilicate and nicotine were employed in mol ratio of 1:2.2, and the amount of methanol solvent was more than sufficient to take into solution all the available copper fluosilicate. On completion of reaction 5 liters of acetone were then used in 500-1000 cc. portions to wash the material, mixing being thorough, and each portion of acetone being poured off from the lower heavy oily layer, and replaced with fresh acetone. The mass in the reaction vessel thickened on successive washing and slowly solidified to a light blue powder which was filtered out, washed with a large portion of acetone, and dried to constant weight at temperature less than 60° C. Yield of 1590 grams of product containing 10.9% Cu, 20.8% $SiF_6$, 59.3% fixed $C_{10}H_{14}N_2$ and 9.0% $H_2O$ was obtained.

*Example 3*

A solution of 660 grams of $ZnSiF_6.6H_2O$ dissolved in 2500 cc. methanol was added to 750 grams of 95% nicotine. The mixture was heated and stirred at temperature of 60° C. for one hour on a steam bath. Mol ratios of $ZnSiF_6$ and nicotine were 1:2.2, and the amount of solvent used was more than enough to effect solution of all $ZnSiF_6$. On completion of reaction, two liters and a half of acetone were used in 500 cc. portions to wash the reaction mass free of methanol, using thorough mixing and pouring off the used acetone. The light brown, more or less solid material obtained, was ground under a little acetone with a pestle, and finally washed on a filter with 500 cc. of acetone. On drying to constant weight at temperature of less than 60° C., yield of 951 grams of product containing 13.0% Zn, 24.6% $SiF_6$, 48.0% fixed $C_{10}H_{14}N_2$, and 14.4% $H_2O$ was obtained.

The metal nicotinyl fluosilicate products hereinabove described have been found useful for combatting (a) insects susceptible to control by stomach poison insecticides; notably chewing insects such as insects of the Lepidoptera order which chew in the larvae stage, including codling moth adults and larvae; insects of the Coleoptera order which chew in the larvae and adult stages, including Mexican bean beetle and larvae; insects of the order of Orthoptera which chew in the nymph and adult stages, such as the American cockroach; (b) insects which lacerate the epidermis of plants and suck up the exuding sap such as insects of the order of Homoptera, including pea, cabbage, bean and peach aphis and bean and cranberry leaf hopper; insects of the order of Thysanoptera (rasping and sucking), including citrus thrips; insects of the order of Acarina (sucking in the nymph and adult stages), including red spider which attack citrus trees, red mite which attacks apple, pear and citrus trees, and the bud mite which attacks the lemon tree; insects of the order of Hemiptera (piercing and sucking), including lace bugs; (c) insects of the order of Diptera (chewing, piercing and sucking), including mosquitoes and also for combatting fungus growths.

We claim:

1. A metal nicotinyl fluosilicate in which the metal is selected from the group consisting of copper, zinc, cobalt and nickel.
2. A copper nicotinyl fluosilicate.
3. A zinc nicotinyl fluosilicate.

JOHN H. PEARSON.
HOWARD D. SEGOOL.

(References on following page)

REFERENCES CITED

The following references are of record in the file of this patent:

UNITED STATES PATENTS

| Number | Name | Date |
|---|---|---|
| 1,634,791 | Minaeff | July 5, 1927 |
| 1,915,334 | Salzberg et al. | June 27, 1934 |
| 2,110,608 | Moore et al. | Mar. 8, 1938 |
| 2,150,601 | Flint | Mar. 14, 1939 |
| 2,356,185 | Smith | Aug. 22, 1944 |
| 2,360,042 | Dearborn | Oct. 10, 1944 |

FOREIGN PATENTS

| Number | Country | Date |
|---|---|---|
| 492,660 | Great Britain | Sept. 20, 1938 |

OTHER REFERENCES

Barral, Comp. Rendu., vol. 14, pp. 224–226 (1842).

Journal of Economic Entomology, vol. 34, No. 1, pp. 80, 81, Feb. 1941, by Hansberry et al.

Hansberry, J. Econ. Entomology, vol 35, pp. 915–918 (1942).